(12) United States Patent
McCaughey et al.

(10) Patent No.: US 9,172,134 B2
(45) Date of Patent: Oct. 27, 2015

(54) PROTECTIVE COVER FOR A WIRELESS DEVICE

(71) Applicant: ANTENNA79, INC., Encinitas, CA (US)

(72) Inventors: Ryan Gerard McCaughey, Leesburg, VA (US); Karl Richard Shields, Leesburg, VA (US); Nikhil Nilakantan, Leesburg, VA (US)

(73) Assignee: Antenna79, Inc., Encinitas, CA (US)

( * ) Notice: Subject to any disclaimer, the term of this patent is extended or adjusted under 35 U.S.C. 154(b) by 475 days.

(21) Appl. No.: 13/659,595

(22) Filed: Oct. 24, 2012

(65) Prior Publication Data

US 2013/0109435 A1    May 2, 2013

Related U.S. Application Data

(63) Continuation-in-part of application No. 13/287,680, filed on Nov. 2, 2011, now Pat. No. 8,957,813.

(51) Int. Cl.
| | |
|---|---|
| *H01Q 1/24* | (2006.01) |
| *H04M 1/00* | (2006.01) |
| *H01Q 7/00* | (2006.01) |
| *H01Q 19/00* | (2006.01) |
| *H01Q 19/28* | (2006.01) |
| *H04B 1/3888* | (2015.01) |

(Continued)

(52) U.S. Cl.
CPC .............. *H01Q 1/243* (2013.01); *H01Q 1/245* (2013.01); *H01Q 7/00* (2013.01); *H01Q 17/00* (2013.01); *H01Q 19/005* (2013.01); *H01Q 19/28* (2013.01); *H04B 1/3888* (2013.01); *H04M 1/0283* (2013.01); *H04M 1/185* (2013.01)

(58) Field of Classification Search
USPC ................... 343/702, 872; 455/556.1, 575.8
See application file for complete search history.

(56) References Cited

U.S. PATENT DOCUMENTS

| 3,778,836 A | 12/1973 | Tanaka |
| 5,278,571 A | 1/1994 | Helfrick |

(Continued)

FOREIGN PATENT DOCUMENTS

| CN | 1918745 A | 2/2007 |
| CN | 102130371 | 7/2011 |

(Continued)

OTHER PUBLICATIONS

Second Office Action for Chinese Application No. 200910221262.X, issued Nov. 22, 2013.

(Continued)

*Primary Examiner* — Tan Ho
(74) *Attorney, Agent, or Firm* — Cooley LLP

(57) ABSTRACT

In some embodiments, an apparatus includes a protective cover configured to attach to a wireless device having a surface including a first portion and a second portion mutually exclusive from the first portion. The second portion of the surface is associated with a proximity sensor of the wireless device. The protective cover is configured to cover the first portion of the surface when the protective cover is attached to the wireless device. The protective cover is configured to not cover the second portion of the surface when the protective cover is attached to the wireless device such that the proximity sensor is not triggered by the protective cover when the protective cover is attached to the wireless device and when the wireless device is operational.

20 Claims, 15 Drawing Sheets

(51) Int. Cl.
*H01Q 17/00* (2006.01)
*H04M 1/02* (2006.01)
*H04M 1/18* (2006.01)

(56) References Cited

U.S. PATENT DOCUMENTS

| | | | |
|---|---|---|---|
| 5,338,896 A | 8/1994 | Danforth | |
| 5,550,552 A | 8/1996 | Oxley | |
| 5,711,014 A | 1/1998 | Crowley et al. | |
| 5,726,383 A | 3/1998 | Geller et al. | |
| 5,777,261 A | 7/1998 | Katz | |
| 5,787,340 A | 7/1998 | Sepponen | |
| 6,031,495 A | 2/2000 | Simmons et al. | |
| 6,082,535 A | 7/2000 | Mitchell | |
| 6,249,256 B1 | 6/2001 | Luxon et al. | |
| 6,341,217 B1 | 1/2002 | Wong | |
| 6,359,213 B1 | 3/2002 | Long | |
| 6,492,957 B2 | 12/2002 | Carillo, Jr. et al. | |
| 6,515,223 B2 | 2/2003 | Tashjian | |
| 6,568,576 B1 | 5/2003 | Godshaw et al. | |
| 6,576,832 B2 | 6/2003 | Svarfvar et al. | |
| 6,603,430 B1 | 8/2003 | Hill et al. | |
| 6,603,981 B1 | 8/2003 | Carillo, Jr. et al. | |
| 6,615,026 B1 | 9/2003 | Wong | |
| 6,677,906 B2 | 1/2004 | Quinn et al. | |
| 6,711,387 B1 | 3/2004 | Lungley | |
| 6,768,523 B2 | 7/2004 | Cheng et al. | |
| 6,855,883 B1 | 2/2005 | Matsui | |
| 6,856,819 B2 | 2/2005 | Itoh | |
| 6,871,079 B1 | 3/2005 | Choi et al. | |
| 6,880,737 B2 | 4/2005 | Bauer | |
| 6,924,770 B2 | 8/2005 | Carpenter et al. | |
| 6,947,000 B2 | 9/2005 | Ito | |
| 6,950,674 B2 | 9/2005 | Jarrett | |
| 6,980,777 B2 | 12/2005 | Shepherd et al. | |
| 6,985,110 B2 | 1/2006 | Tanaka et al. | |
| 7,031,762 B2 | 4/2006 | Shoji et al. | |
| 7,065,379 B1 | 6/2006 | Kim et al. | |
| 7,164,933 B1 | 1/2007 | Steigerwald et al. | |
| 7,202,825 B2 | 4/2007 | Leizerovich et al. | |
| 7,203,533 B1 | 4/2007 | Tischer | |
| 7,206,618 B2 | 4/2007 | Latto et al. | |
| 7,230,574 B2 | 6/2007 | Johnson | |
| 7,327,841 B2 | 2/2008 | Schreiber et al. | |
| 7,494,069 B2 | 2/2009 | Shimada | |
| 7,541,986 B2 | 6/2009 | Park | |
| 7,812,770 B2 | 10/2010 | Qi et al. | |
| 8,068,061 B2 | 11/2011 | Qi et al. | |
| 8,208,980 B2 | 6/2012 | Wong et al. | |
| 8,214,003 B2 | 7/2012 | Wong et al. | |
| 8,325,094 B2 | 12/2012 | Ayala Vazquez et al. | |
| 8,442,593 B1 * | 5/2013 | Kwon et al. | 455/566 |
| 8,442,602 B2 | 5/2013 | Wong et al. | |
| 8,750,948 B2 | 6/2014 | Wong et al. | |
| 8,897,843 B2 | 11/2014 | Wong et al. | |
| 8,957,813 B2 | 2/2015 | McCaughey et al. | |
| 2002/0009976 A1 | 1/2002 | Rashidi | |
| 2002/0074142 A1 | 6/2002 | Katz | |
| 2002/0183013 A1 | 12/2002 | Auckland et al. | |
| 2002/0193136 A1 | 12/2002 | Halkosaari et al. | |
| 2003/0078037 A1 | 4/2003 | Auckland et al. | |
| 2004/0014506 A1 | 1/2004 | Kemppinen | |
| 2005/0079820 A1 | 4/2005 | Yamashita | |
| 2005/0104782 A1 | 5/2005 | Peled et al. | |
| 2005/0195119 A1 | 9/2005 | Gaucher et al. | |
| 2005/0226353 A1 | 10/2005 | Gebara et al. | |
| 2006/0019696 A1 | 1/2006 | Brunel et al. | |
| 2006/0022889 A1 | 2/2006 | Chiang et al. | |
| 2006/0232483 A1 | 10/2006 | Iwai et al. | |
| 2006/0290575 A1 | 12/2006 | Pelzer | |
| 2007/0004456 A1 | 1/2007 | Shimada | |
| 2007/0241977 A1 | 10/2007 | Vance | |
| 2008/0007468 A1 | 1/2008 | Sato et al. | |
| 2008/0165064 A1 | 7/2008 | Hill et al. | |
| 2008/0316111 A1 | 12/2008 | Aoyama et al. | |
| 2009/0124215 A1 | 5/2009 | Nysen | |
| 2009/0156151 A1 | 6/2009 | Anguera et al. | |
| 2009/0289737 A1 | 11/2009 | Itoh et al. | |
| 2009/0318094 A1 | 12/2009 | Pros et al. | |
| 2010/0033383 A1 | 2/2010 | Yamamoto | |
| 2010/0078343 A1 | 4/2010 | Hoellwarth et al. | |
| 2010/0093412 A1 * | 4/2010 | Serra et al. | 455/575.8 |
| 2010/0097286 A1 | 4/2010 | Morrow et al. | |
| 2010/0105452 A1 * | 4/2010 | Shin et al. | 455/575.8 |
| 2010/0113111 A1 | 5/2010 | Wong et al. | |
| 2010/0214180 A1 | 8/2010 | Krogerus | |
| 2010/0216520 A1 | 8/2010 | Lee | |
| 2010/0234081 A1 | 9/2010 | Wong et al. | |
| 2010/0291965 A1 | 11/2010 | Tabe | |
| 2011/0012794 A1 | 1/2011 | Schlub | |
| 2011/0036912 A1 | 2/2011 | Guo et al. | |
| 2011/0109515 A1 | 5/2011 | Rao | |
| 2011/0140982 A1 | 6/2011 | Ozden et al. | |
| 2012/0044115 A1 | 2/2012 | Mccaughey et al. | |
| 2012/0074231 A1 | 3/2012 | Jain et al. | |
| 2012/0129579 A1 | 5/2012 | Tam | |
| 2012/0242549 A1 | 9/2012 | Wong et al. | |
| 2012/0309472 A1 | 12/2012 | Wong et al. | |
| 2013/0203470 A1 * | 8/2013 | Schneider et al. | 455/566 |
| 2013/0252677 A1 | 9/2013 | Wong et al. | |
| 2013/0281169 A1 * | 10/2013 | Coverstone et al. | 455/575.8 |
| 2013/0286582 A1 | 10/2013 | Dabov et al. | |
| 2013/0328825 A1 * | 12/2013 | Brown et al. | 345/174 |
| 2014/0057686 A1 | 2/2014 | McCaughey et al. | |
| 2014/0128131 A1 * | 5/2014 | Sin | 455/575.8 |
| 2014/0287697 A1 | 9/2014 | Wong et al. | |
| 2014/0306553 A1 * | 10/2014 | Lee | 307/326 |
| 2015/0077295 A1 | 3/2015 | Wong et al. | |

FOREIGN PATENT DOCUMENTS

| | | |
|---|---|---|
| EP | 1 292 042 A2 | 3/2003 |
| EP | 1 835 562 A1 | 9/2007 |
| EP | 1 942 580 A2 | 7/2008 |
| WO | WO 00/13330 | 3/2000 |
| WO | WO 01/35487 A1 | 5/2001 |
| WO | WO 02/095867 A1 | 11/2002 |
| WO | WO 03/028424 A1 | 4/2003 |

OTHER PUBLICATIONS

U.S. Appl. No. 14/071,197, filed Nov. 4, 2013.
Patent Examination Report No. 1 for Australian Application No. 2009313338, mailed Mar. 6, 2013.
International Search Report and Written Opinion for International Application No. PCT/US2012/062995, mailed Mar. 8, 2013.
Office Action for U.S. Appl. No. 12/614,132, mailed Oct. 20, 2011.
Final Office Action for U.S. Appl. No. 12/614,132, mailed Mar. 1, 2012.
Office Action for U.S. Appl. No. 12/724,290, mailed Nov. 9, 2011.
International Search Report and Written Opinion for International Application No. PCT/US2009/063618, mailed Mar. 1, 2010.
Office Action for U.S. Appl. No. 13/491,747, mailed Sep. 7, 2012.
Office Action for U.S. Appl. No. 13/894,039, mailed Jul. 25, 2013.
First Office Action for Chinese Application No. 200910221262.X, issued May 3, 2013.
Office Action for U.S. Appl. No. 13/287,680, mailed Apr. 2, 2014.
Office Action for U.S. Appl. No. 13/492,518, mailed Mar. 21, 2014.
Office Action for U.S. Appl. No. 13/894,039, mailed Jan. 13, 2014.
Office Action for U.S. Appl. No. 14/071,197, mailed Mar. 20, 2014.
Patent Examination Report No. 2 for Australian Application No. 2009313338, mailed Mar. 11, 2014.
Third Office Action for Chinese Application No. 200910221262.X, mailed Mar. 27, 2014.
Fourth Office Action for Chinese Application No. 200910221262.X, mailed Oct. 17, 2014.
Final Office Action for U.S. Appl. No. 14/071,197, mailed Aug. 18, 2014.
Office Action for U.S. Appl. No. 14/297,162, mailed Feb. 10, 2015.
International Search Report and Written Opinion for International Application No. PCT/US2014/063665, mailed Feb. 4, 2015.

(56) References Cited

OTHER PUBLICATIONS

Office Action for U.S. Appl. No. 14/071,197, mailed May 26, 2015.
Extended Search Report for European Application No. 12846415.3, mailed May 15, 2015.
"Defender Series for Nokia E72 Protection that Works" Dec. 31, 2010, Retrieved from the Internet:<URL:http://www.techbuy.com. au/images/addi/13/File1315854598.pdf> [retrieved on May 7, 2015], 1 page & "Otterbox Nokia E71 E71x Defender Series Case—Original (OEM) NOK2-371xx-20-C50tr_A," Dec. 31, 2010, Retrieved from the Internet: <URL:https://www.youtube.com/watch?v=TDrVce-jaGY] [retrieved on May 7, 2015].
First Office Action for Chinese Application No. 201280064893.5, mailed Jun. 3, 2015.

* cited by examiner

PROTECTIVE COVER FOR A WIRELESS DEVICE

CROSS REFERENCE TO RELATED APPLICATIONS AND CLAIM FOR PRIORITY

This application is a continuation-in-part of U.S. patent application Ser. No. 13/287,680, entitled "EXTERNAL CASE FOR REDISTRIBUTION OF RF RADIATION AWAY FROM WIRELESS COMMUNICATION DEVICE USER AND WIRELESS COMMUNICATION DEVICE INCORPORATING RF RADIATION REDISTRIBUTION ELEMENTS," filed on Nov. 2, 2011, (now U.S. Pat. No. 8,957,813).

This application is related to U.S. patent application Ser. No. 12/724,290 filed Mar. 15, 2010 (now U.S. Pat. No. 8,214,003), which claims priority to and the benefit of Provisional Application No. 61/160,282, filed Mar. 13, 2009, and is also a continuation-in-part of U.S. patent application Ser. No. 12/614,132, filed Nov. 6, 2009 (now U.S. Pat. No. 8,208,980), which claims priority to and the benefit of U.S. Provisional Application No. 61/112,141, filed Nov. 6, 2008 and U.S. Provisional Application No. 61/158,551, filed Mar. 9, 2009; all of which are incorporated herein by reference in their entirety.

BACKGROUND

Some embodiments discussed herein relate generally to wireless devices such as cell phones, smart phones, and similar handheld devices such as tablet computer or tablets. Such embodiments include a protective cover that can be attached to, and protect, a surface of such a wireless device without negatively impacting the performance of the wireless device or affecting other functions of the wireless device.

Some known protective covers can be applied on the wireless devices to cover and protect a screen and/or other portions of a surface of the wireless devices. Such known protective covers, however, typically affect RF (radio frequency) transmission or some other functions of the wireless devices. For example, some of the known protective covers can trigger an embedded proximity sensor, thus limiting RF transmission from the wireless devices. For another example, some of the known protective cover can block a camera embedded in the wireless devices.

Accordingly, a need exists for an apparatus that can provide protection to a screen or surface of a wireless device without triggering a proximity sensor or blocking a camera of that wireless device.

SUMMARY

In some embodiments, an apparatus includes a protective cover configured to attach to a wireless device having a surface including a first portion and a second portion mutually exclusive from the first portion. The second portion of the surface is associated with a proximity sensor of the wireless device. The protective cover is configured to cover the first portion of the surface when the protective cover is attached to the wireless device. The protective cover is configured to not cover the second portion of the surface when the protective cover is attached to the wireless device such that the proximity sensor is not triggered by the protective cover when the protective cover is attached to the wireless device and when the wireless device is operational.

DETAILED DESCRIPTION

Figure 1:
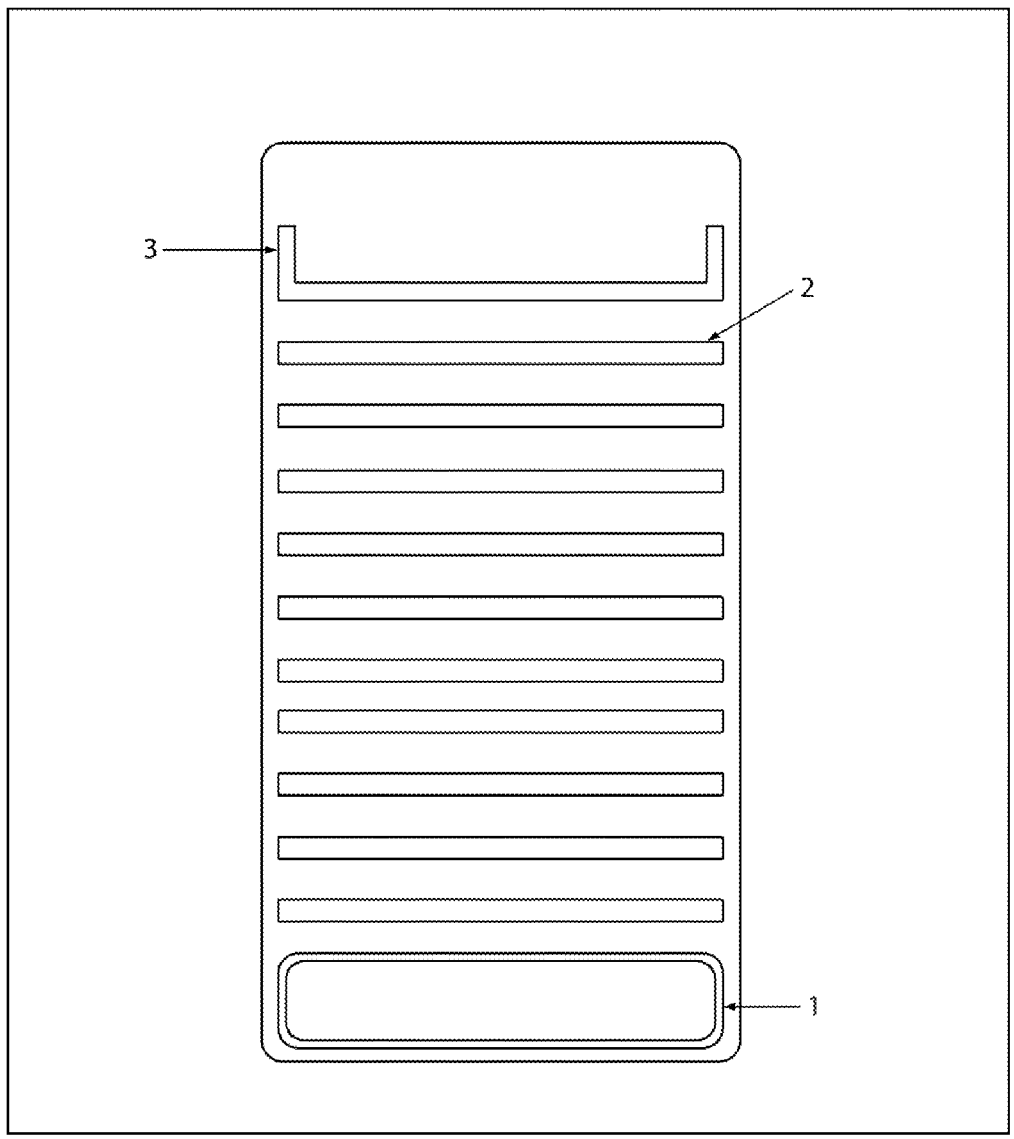
FIG. 1 shows RF coupling elements mounted on the back of a mobile telephone.

In some embodiments, external coupling antennas are provided to couple radiation from the internal antenna of a wireless device and to redirect the radiation such that a reduced or minimum amount of radiation is directed towards the user and an increased or maximum amount of radiation is directed away from the user. Note that this coupling method does not require an actual physical connection between the external coupling antennas and the antenna internal to the phone. The position of the coupling antenna with respect to the internal antenna, however, can be important. Through a series of coupling loops, directing elements or patch antennas located on a cover or case, a "clip" structure, or directly on an external surface of the mobile device, the radiation is further directed away from the user's head (which is absorptive) to the environment for communication to cell towers.

The materials used for coupling and re-directional elements are generally made out of materials of high electrical conductivity. Dielectric materials, however, can also be used to achieve optimal physical sizes and spacing of various elements.

In some embodiments, an apparatus includes a protective cover configured to attach to a wireless device having a surface including a first portion and a second portion mutually exclusive from the first portion. The protective cover can be removably attached to the wireless device. In some embodiments, the protective cover is disposed between the surface of the wireless device and a user of the wireless device when the protective cover is attached to the wireless device and when the wireless device is used by the user. In some embodiments, the protective cover is substantially planar, and the wireless device can be a tablet computer device.

The protective cover is configured to cover the first portion of the surface when the protective cover is attached to the wireless device. In some embodiments, the protective cover is transparent such that the first portion of the surface is visible to a user of the wireless device when the protective cover is attached to the wireless device. In some embodiments, the first portion of the surface includes at least one of a screen of the wireless device or a touchscreen of the wireless device.

The second portion of the surface is associated with a proximity sensor of the wireless device. The protective cover is configured to not cover the second portion of the surface when the protective cover is attached to the wireless device such that the proximity sensor is not triggered by the protective cover when the protective cover is attached to the wireless device and when the wireless device is operational. As a result, a total radiated power (TRP) of the wireless device is not reduced when the protective cover is attached to the wireless device and when the wireless device is operational.

In some embodiments, the second portion of the surface is associated with a camera of the wireless device. The protective cover is configured to not cover the second portion of the surface when the protective cover is attached to the wireless device such that a direct access to the camera is not blocked by the protective cover when the protective cover is attached to the wireless device.

The above procedures and apparatus are illustrated by the treatment of three exemplary wireless devices—the Apple 3G iPhone®, the RIM Blackberry® Curve 8300, and/or the Apple iPad®. The procedures and apparatus, however, are perfectly general and can be applied to any wireless device using different combinations of the elements described.

Figure 2:
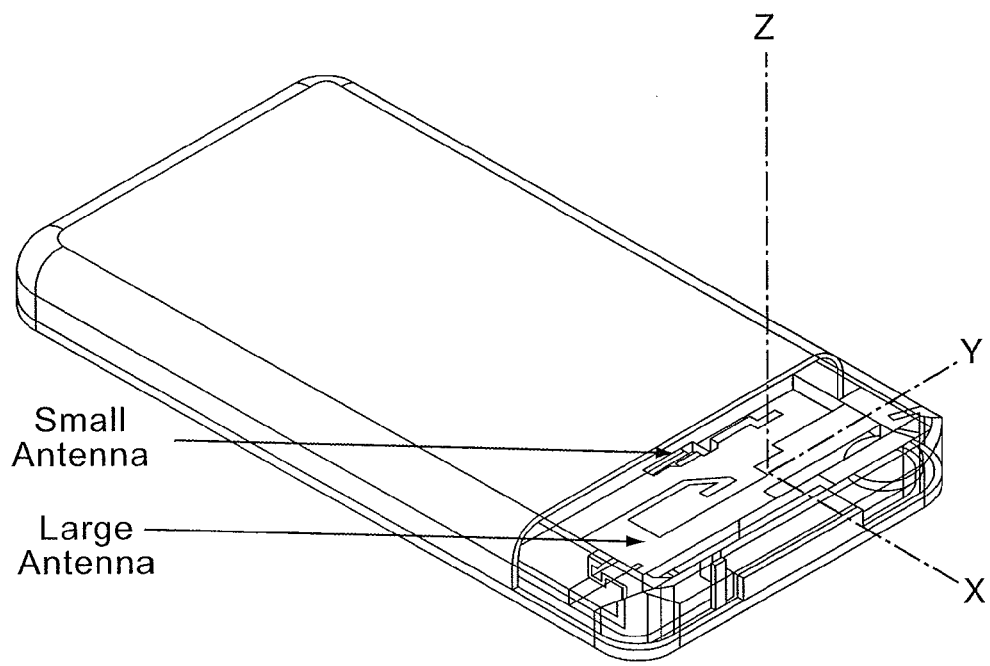
FIG. 2 shows a perspective view of a mobile telephone with placement of small and large antennas.

FIG. 1 shows RF coupling elements mounted on the back of a wireless device such as a mobile telephone. The radiation from an internal antenna (not shown in FIG. 1) of the wireless device is directed away from the user and outward at the back of the wireless device through a coupling loop 1 mounted on the back of the wireless device. The coupling can be achieved through, for example, electromagnetic (EM) induction as revealed by laboratory experiments and computer modeling of various physical quantities (e.g., antennas, connectors, circuit elements, ground planes, etc.) inside the wireless device such as an Apple iPhone®, as illustrated in FIG. 2. The EM fields are then successively coupled up a "ladder" of metallic strips 2 up the backside of the iPhone® enclosed inside the case. The placement of the coupling loop 1 with respect to the antenna inside the wireless device can be specific to that wireless device. As shown in FIG. 1, the horizontal metallic strips may be straight, or may have regular or irregular shapes such as "U" shaped metallic element 3, whose dimensions are adjusted to fit the available space on the back of the wireless device, while achieving optimal coupling from the loop 1.

Figure 3:
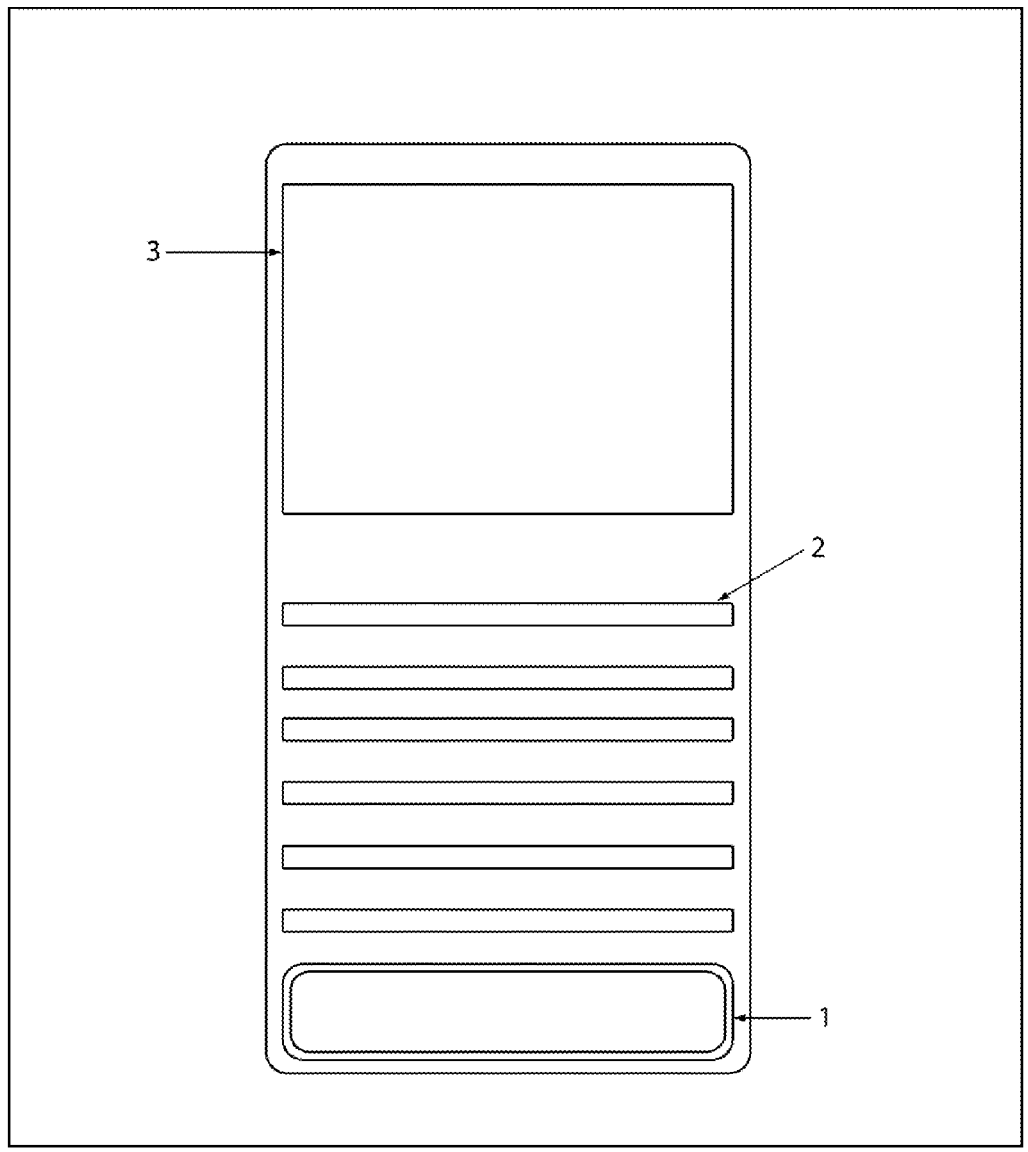
FIG. 3 shows an RF loop over an internal antenna of a mobile telephone.

One variation of the above design is in the replacement of an uppermost radiation re-director by a single plate 3 as illustrated in FIG. 3. The use of a plate resembles a patch antenna whose radiation pattern favors the outward direction away from the user. The loop 1 can couple power out from the internal antenna, then the directors 2 can couple the power up to the plate 3, from which the radiation can be directed outward from the wireless device in the direction opposite to the user's body (e.g., head).

Figure 4:
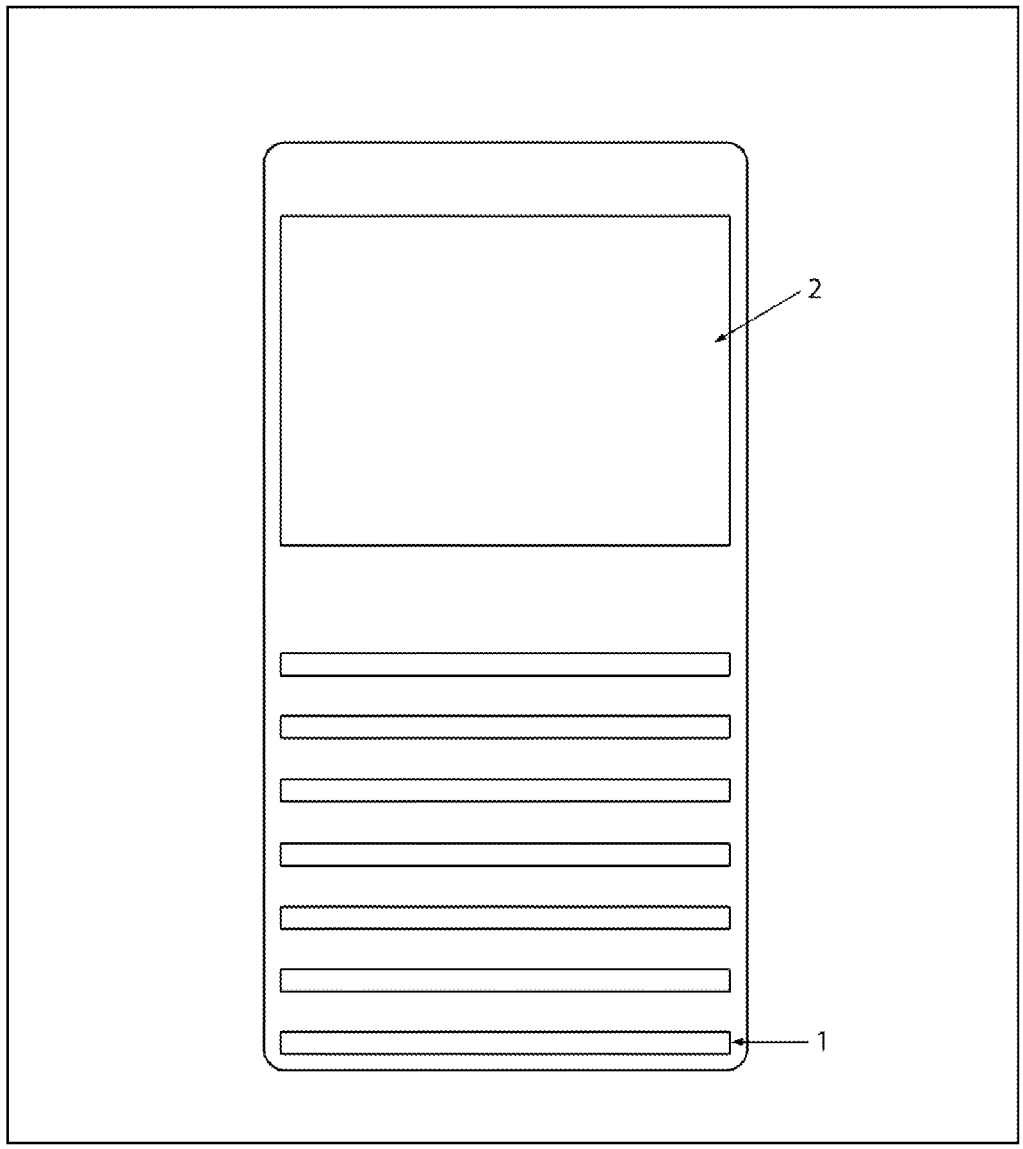
FIG. 4 shows an RF coupling parasitic device mounted on the back of a mobile telephone.
Figure 5:
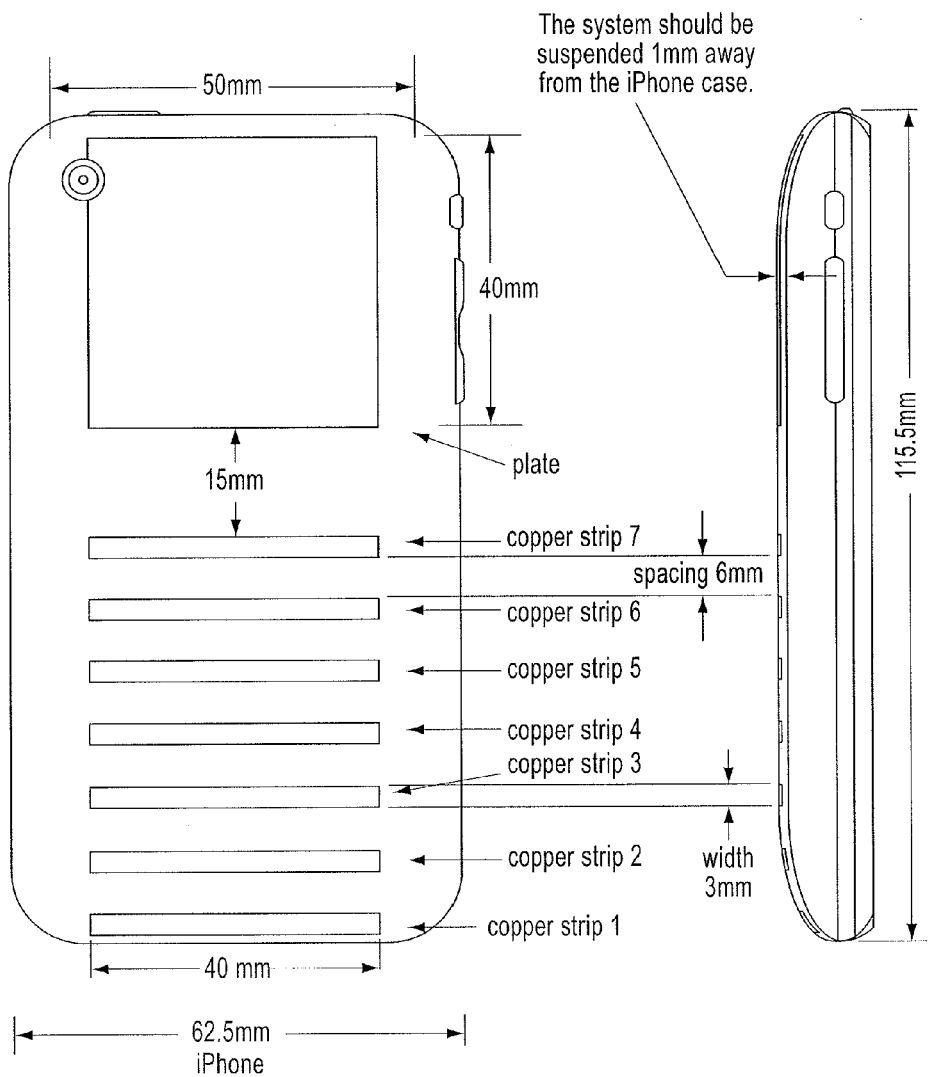
FIG. 5 shows a front and side view of a "ladder and plate" RF coupling design for a mobile telephone.

Another variation, illustrated in FIG. 4, as well as in FIG. 5, which depicts an application of this design to the Apple iPhone® 3G, is the replacement of the coupling loop by an RF coupling parasitic redirector composed of horizontal strips 1 that form a ladder-like array leading to a rectangular plate 2 above the ladder. In some embodiments, such configurations can significantly reduce the amount of radiation directed towards a user while maintaining or even enhancing the total radiation power of the wireless device.

Figure 6:
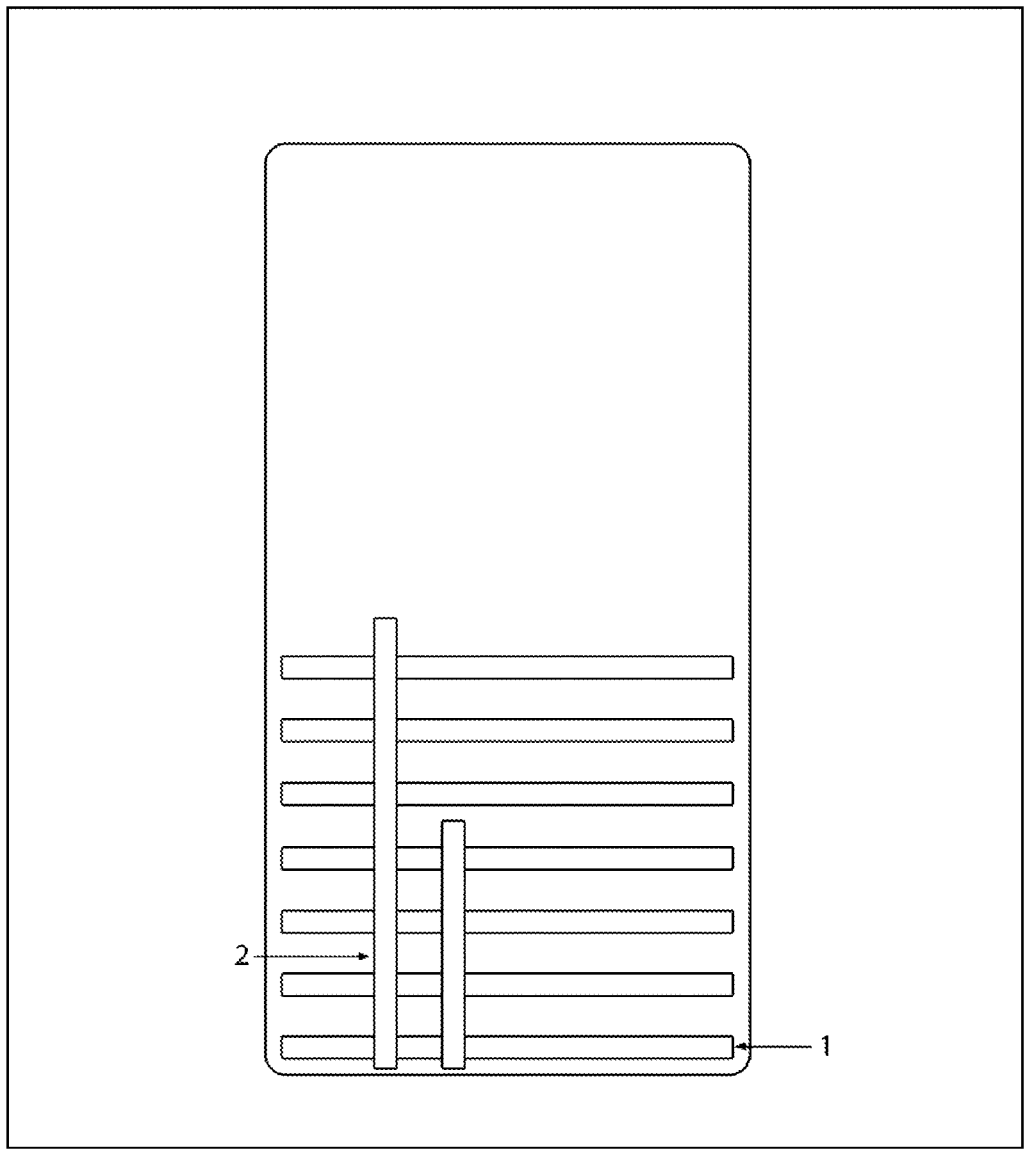
FIG. 6 shows an alternate embodiment of an RC coupling parasitic device mounted on the back of a mobile telephone.

A further embodiment is the use of vertical strips 2 that are orthogonal to the horizontal strips 1, as shown in FIG. 6. These vertical strips can be coupled to a vertical polarization of the radiation from the internal cell phone antenna. Thus, both the vertical polarization and the horizontal polarization can be coupled to fully (or substantially fully) redirect the maximum amount of RF radiation from the internal antenna of the wireless device away from the direction of the user. The vertical strips 2 are placed in a layer above the horizontal strips 1 such that the vertical strips provide additional coupling with any corresponding vertical elements of the internal antenna.

Figure 7:
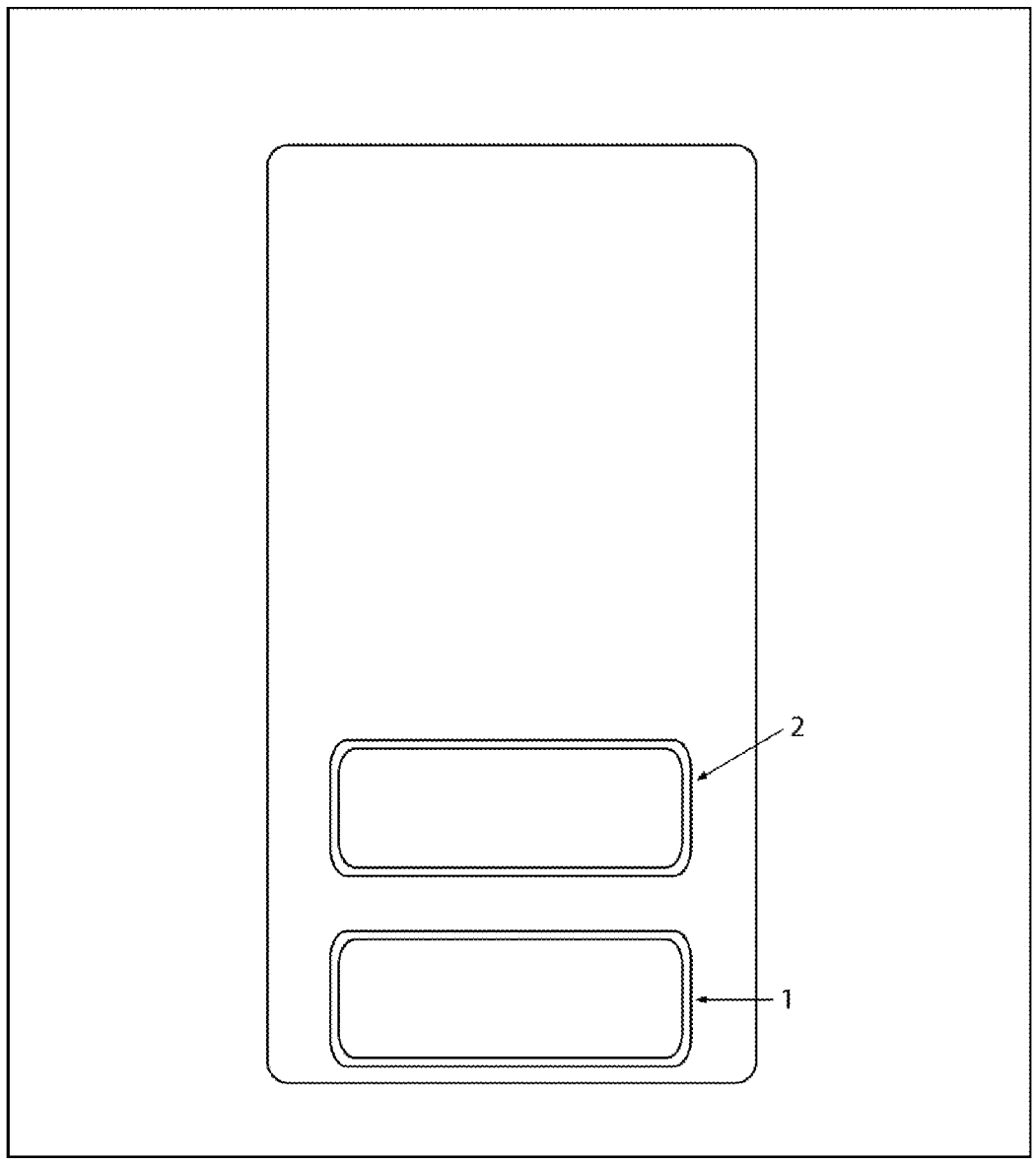
FIG. 7 shows a pair of RF coupling devices in the form of first and second loops mounted on the back of a mobile telephone.
Figure 8:
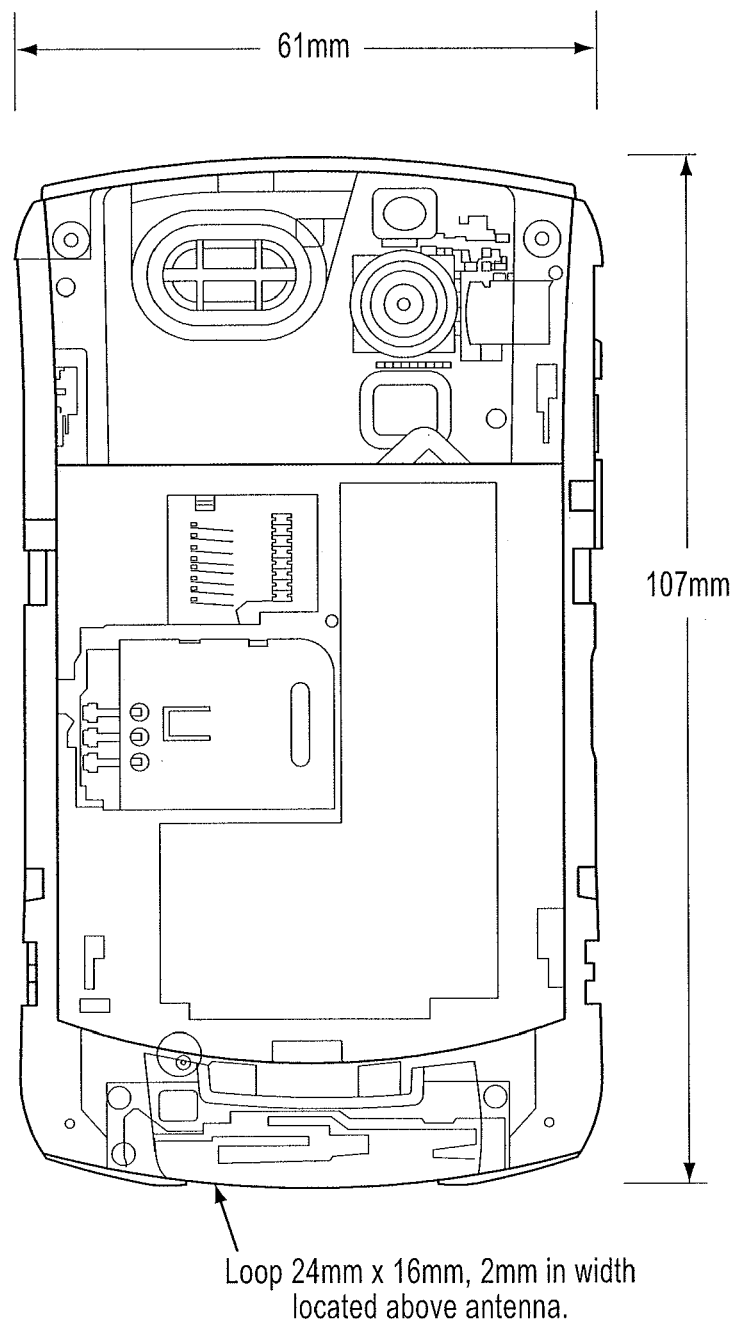
FIG. 8 shows a partial phantom view of an RF coupling loop design where the loop is mounted above the internal antenna of a mobile telephone.

In some embodiments, a simpler approach as illustrated in FIG. 7 can be applied to the internal components of some wireless devices such as the Blackberry® 8300 shown in FIG. 8. As shown in FIG. 7, a single loop 1 is placed over the location of the internal antenna, and may be augmented by a second loop 2 above the first loop 1. The first loop 1 couples the RF field from the internal antenna, and the second loop 2 provides additional redirected radiation away from the user. Size and spacing can be tuned to the particular wireless device. For the Blackberry® 8300, for example, a loop of 24 mm×16 mm×2 mm can be placed such that it wraps under the bottom of the phone by 2 mm as shown in FIG. 8. In some embodiments, such a configuration can produce ideal results in terms of redirecting radiation away from a user as verified by independent laboratory testing by Cetecom in Milpitas, Calif.

Figure 9:
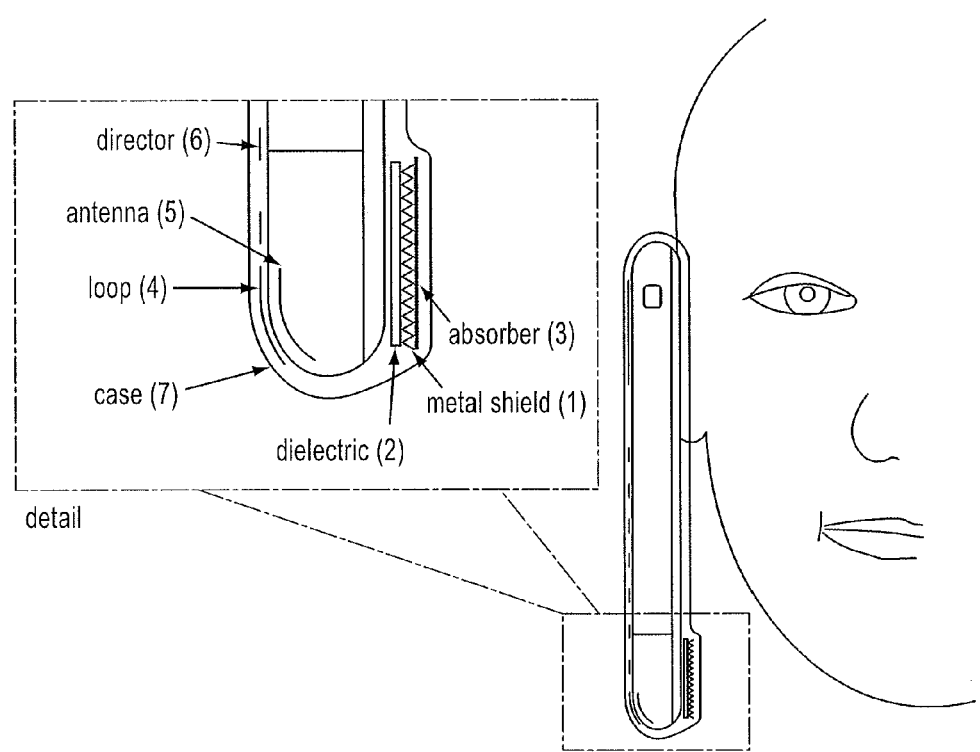
FIG. 9 shows a mobile telephone external case design including a reflective shield at the front side of the device and a radiation coupling device at the rear side of the device.
Figure 10:
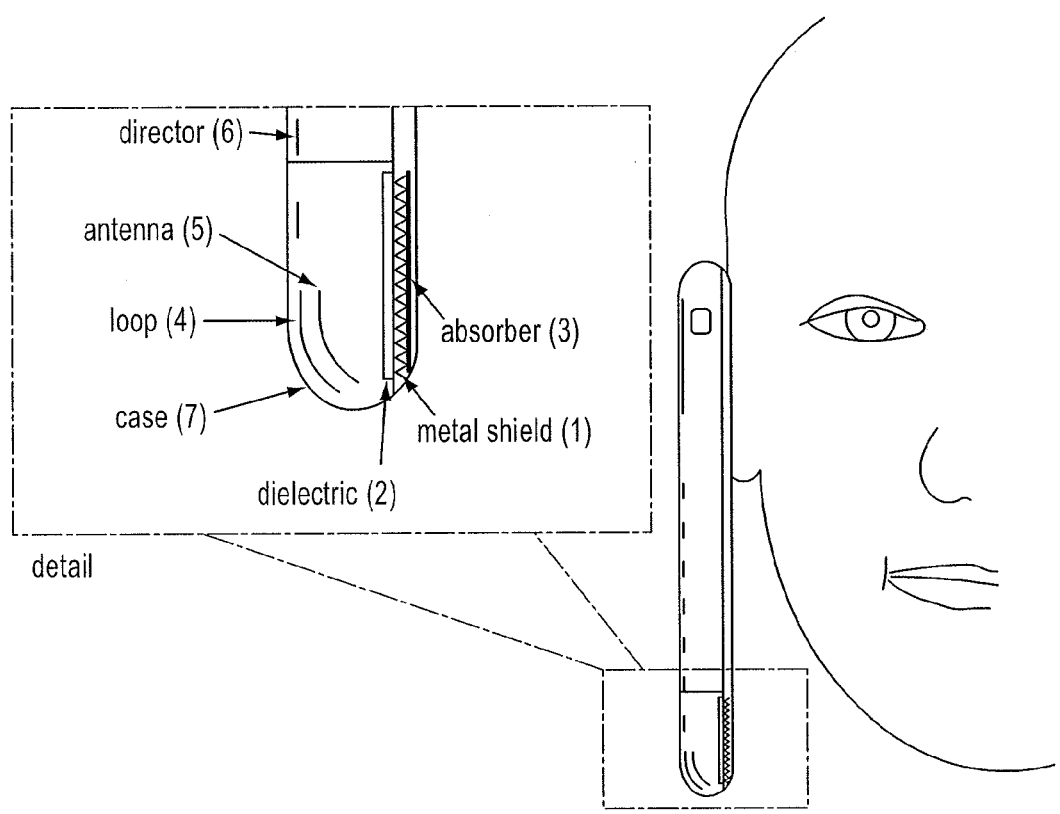
FIG. 10 shows an alternate embodiment of FIG. 9 wherein an RF redirection system is integrated into the internal design of a wireless device.

In another embodiment shown in FIGS. 9 and 10, a shield comprising a corrugated metallic surface is provided, either incorporated into a protective case (FIG. 9), or integrated directly into the body of the wireless device itself (FIG. 10). The metallic shield can be located on the user side of the wireless device directly in front of the internal antenna. Such a shield can also be installed inside the wireless device. Such a corrugated surface can give rise to many image dipoles, thereby providing a wide pattern of scattered radiation. The particular shape and size of corrugations can be designed to scatter radiation, which normally would be incident upon the user, in directions away from the user as widely as possible. In some embodiments, the scattering angles from the incident wave vector can range from +/−40 to +/−180 degrees.

In some embodiments, sizes of the corrugations are smaller than wavelengths of microwave frequencies transmitted from the wireless device. As a result, such corrugations can introduce scattering wave vectors that are greater than the incident wave vector in directions perpendicular to the incident wave vector. Thus, such corrugations can deflect the radiation away from the user and at the same time avoid creating reflections back on the internal radiating antenna. As a result, the impedance seen by the output amplifier of the wireless device (e.g., a cell phone) is not affected and the total radiated power of the wireless device is not reduced, while the specific absorption rate (SAR) is significantly reduced. In such embodiments, the loop 4 and the directors 6 are positioned relative to the internal antenna 5 such that the loop 4 is close to the antenna and couples the RF power out from the back of the wireless device and up to the directors 6.

As shown in FIG. 9, in a case 7, a layer of highly conductive corrugated metal shield material 1 is, optionally, combined with a layer of absorptive material 3 of a specific frequency range, placed on the side of the metallic shield opposite to the internal antenna, such that with the wireless device inserted into the external case the shield is positioned between the user's head and the internal antenna. The absorber 3 can substantially prevent the radiation that passes through the shield from reaching the user. Also, a layer of dielectric material 2 may be added between the internal antenna and the shield to reduce the spacing used to achieve an effective distance between the antenna and the shield. Such an effective distance can be, for example, ¼ wavelength of the RF radiation.

The redirection of RF radiation away from the user's head can also be achieved by the use of a properly located passive RF coupling redirector including the elements 4-6 as shown in FIG. 9, in combination with the corrugated shield of highly conductive metallic material 1. An alternate embodiment as shown in FIG. 10 may have the RF redirector including the elements 4-6 and the metallic shield 1 integrated within the wireless communication device itself.

A feature of various embodiments, both as a passive directional beam antenna alone, or in combination with a passive re-directional shield, incorporated in an external case for a wireless device, or such combination incorporated internally in a wireless device, is that such embodiments direct/redirect radiation away from the user, out of the wireless device, reducing SAR, without adversely affecting TRP. This is done with a directional antenna, or a combination of a directional antenna and re-directive shield, or with a re-directive shield only, integrated within a case of non-conducting or low-conductive materials (e.g., variously of silicone, plastic, cloth, etc.) that allow EM waves to propagate outward toward, for example, the cell phone tower without suffering any attenuation.

Figure 11:
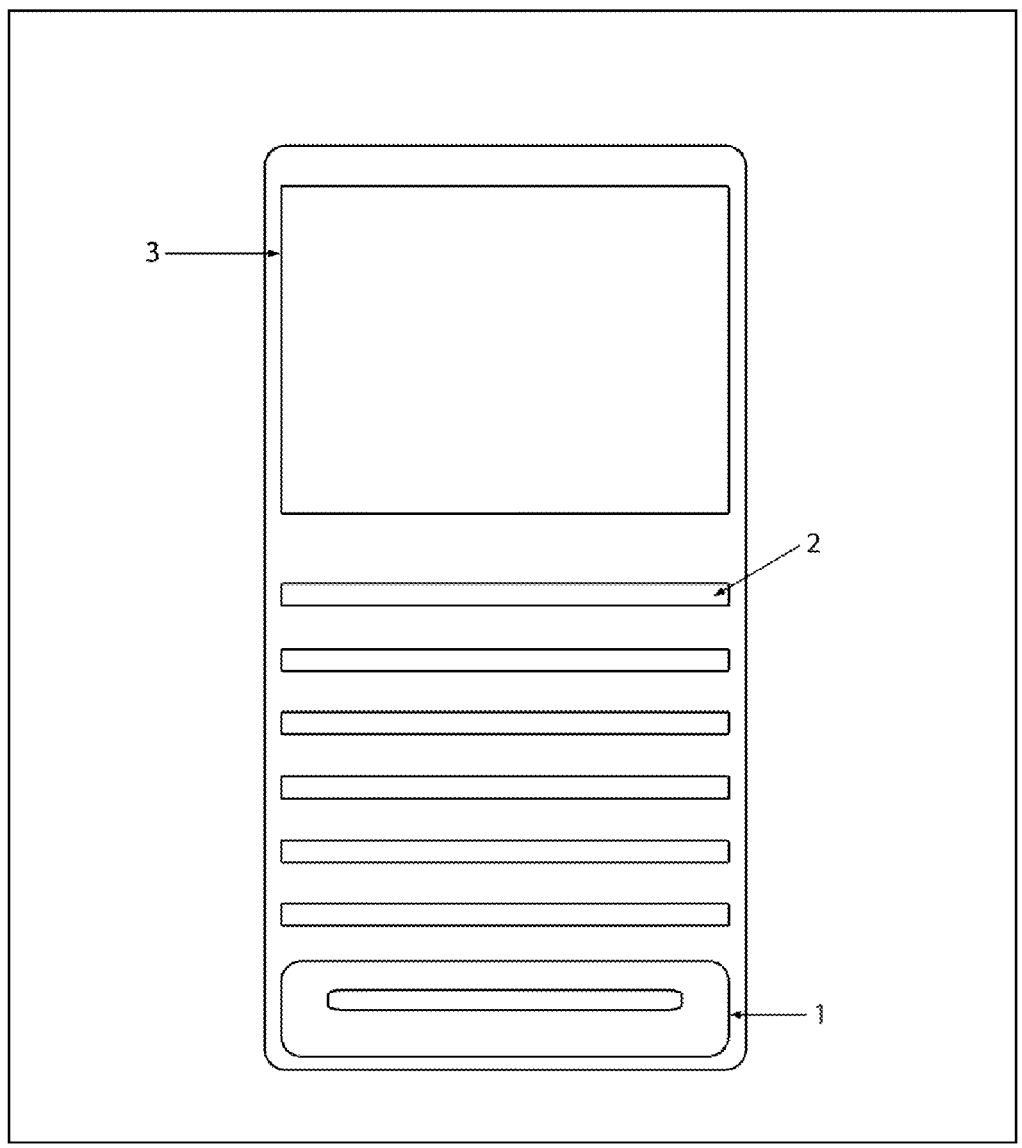
FIG. 11 shows an alternate embodiment of an RF loop design mounted on the back of a mobile telephone device.

A further alternate embodiment of the RF coupling radiation redirector is shown in FIG. 11. Here, a loop 1 consists of a metallic sheet with a narrow slot having a length and width tuned to, for example, ¼ of the wavelength of the transmitting RF radiation. For example, a 1900 MHz transmission would correspond to a 40 mm slot length.

Figure 12:
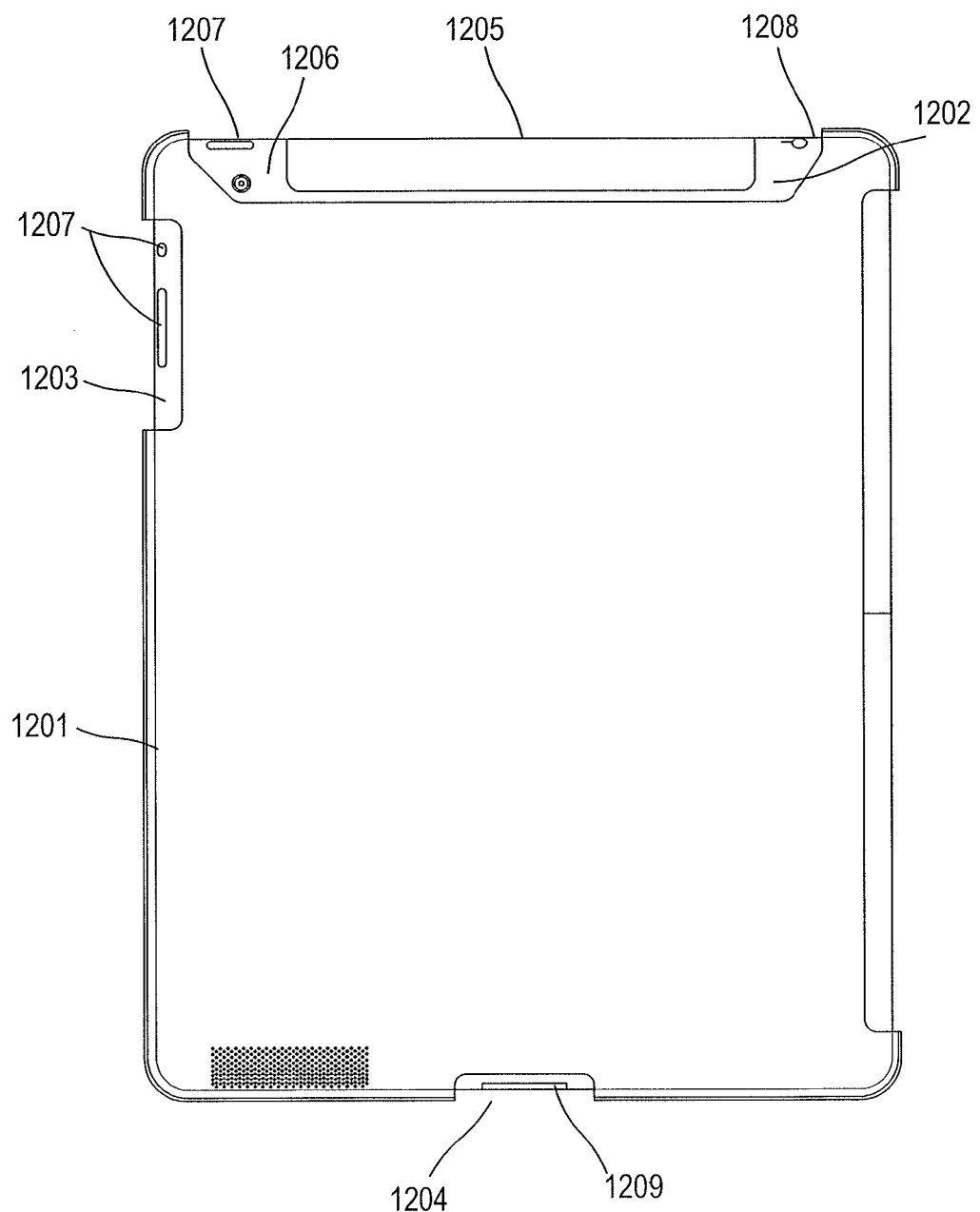
FIG. 12 shows a tablet computer external case design according to one embodiment.

FIG. 12 shows one embodiment of an external case 1201 for a wireless device such as a tablet computer (e.g., an Apple iPad®). The case 1201 can be made of a sturdy material such as polycarbonate. The case 1201 contains a number of cut-out sections 1202, 1203 and 1204, to allow access to a video camera 1206, various switches 1207, headphone jack 1208, and input/power interface 1209. Moreover, the cut-out section 1202 leaves plastic strip 1205 exposed. The plastic strip 1205 is provided on tablet computers having 3G or other mobile telephony capability. This plastic strip 1205 is located over an internal 3G or other mobile telephony antenna, and is provided to enable mobile telephony signals to reach the internal mobile telephony antenna and to enable transmission signals to leave the wireless device.

In conjunction with the plastic strip 1205 being located over an internal mobile telephony antenna, a capacitive proximity sensor (not shown in FIG. 12) may be attached to or disposed proximate to the plastic strip 1205. When a user's body part such as a hand or a lap contacts the strip 1205, the proximity sensor is activated, causing the TRP of the wireless device to be reduced. The purpose of the reduction in TRP is to lower the SAR experienced by the user when using the wireless device in mobile telephony applications. As explained above, however, the reduced TRP reduces the RF signal transmission power, and consequently degrades communication quality. As shown in FIG. 12, the external case 1201 does not cover the mobile antenna strip 1205, thus not causing any constant reduction in transmission signal quality whenever the external case 1201 is used with the device.

Accordingly, the case 1201 defines a cut-out section 1202 in the location of the strip 1205, which covers the internal mobile telephony antenna. In this way, use of the external case 1201 does not affect the TRP produced by the tablet during mobile telephony applications (such as telephone calls, Internet applications, video conferencing, etc.).

Figure 13:
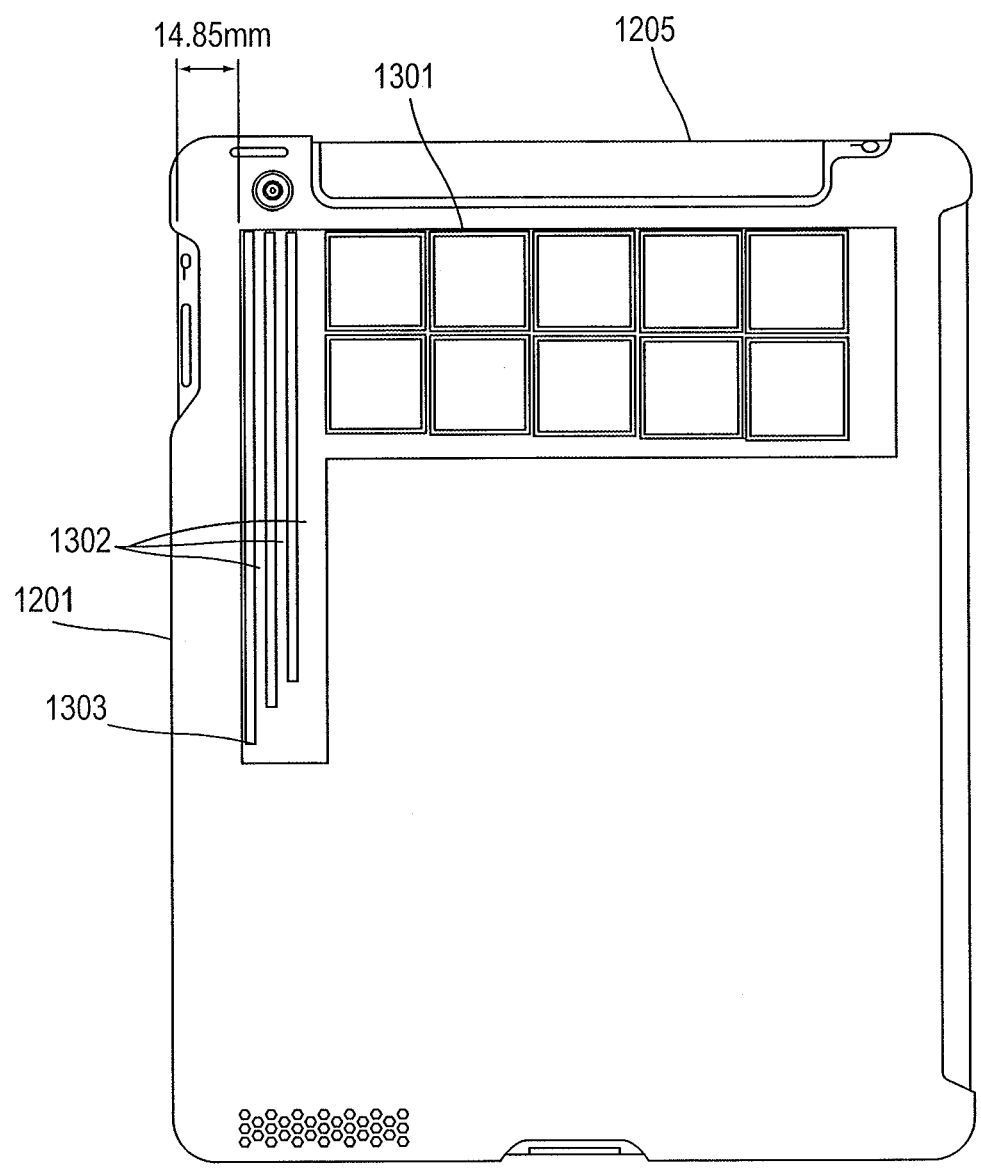
FIG. 13 shows details of RF radiation redistribution elements embedded in the external case of FIG. 12.
Figure 14:
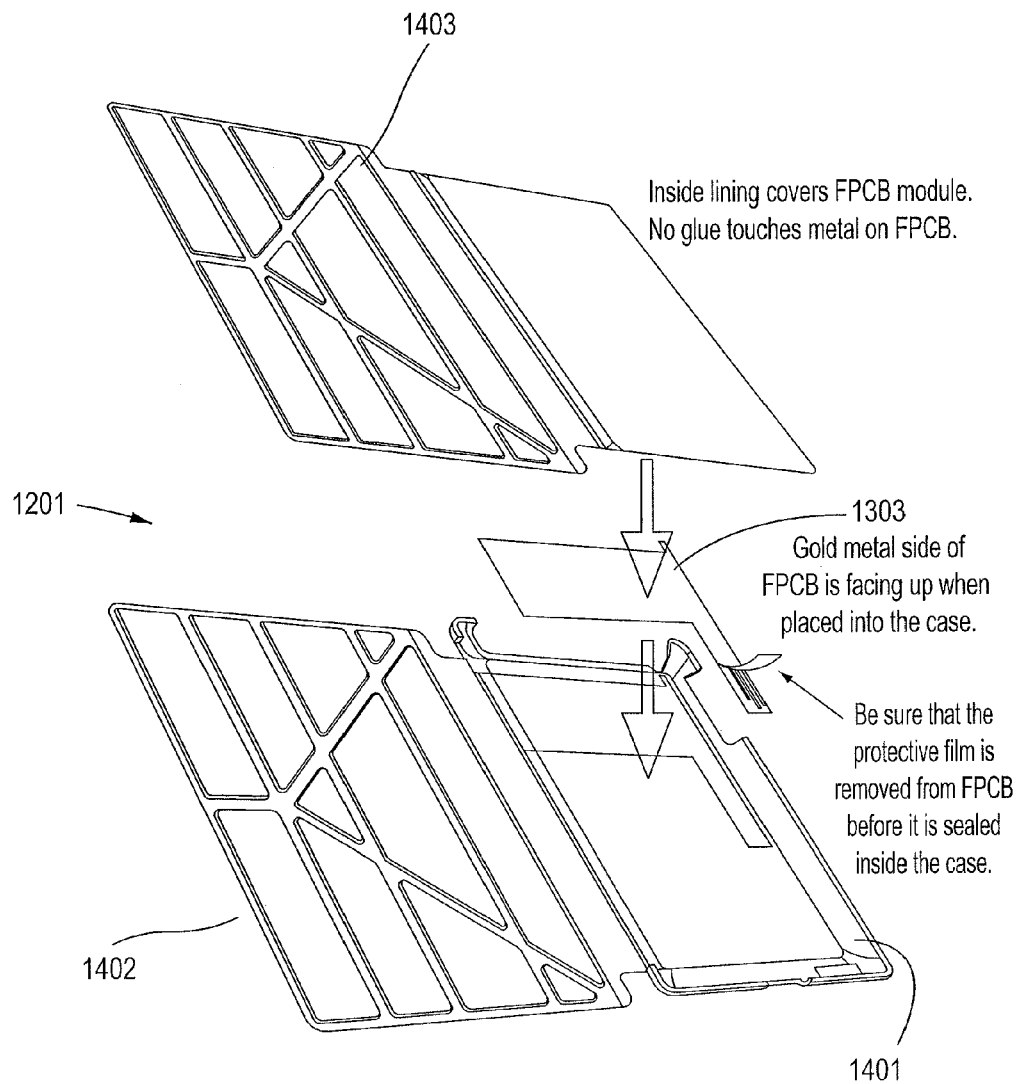
FIG. 14 is an exploded view of various component parts of an external case for a tablet computer in accordance with one embodiment.

As shown in FIG. 13, a number of RF radiation redistribution components are embedded in the external case 1201. The radiation redistribution components may be in the form of resonant loops 1301 and radiation directors 1302. A Flexible Printed Circuit Board (FPCB) 1303 as shown in FIGS. 13 and 14 is embedded in a polycarbonate shell 1401 (FIG. 14), which holds the FPCB 1303 on the back of the tablet. Note that the resonant loops 1301, the radiation directors 1302 and the FPCB 1303 are shown in FIG. 13 for illustrative purpose, but would not normally be seen from the external case 1201.

The resonant loops 1301 can be made of 1 oz of copper elements upon a 2 mil thick polyimide substrate (the resonant loops are typically rectangular or square in shape, but may be formed in any desired shape). The loops 1301 have perimeters that substantially equal, for example, approximately 1 wavelength of the emitted RF transmission wave as it travels through the polycarbonate material, i.e., the loops 1301 are resonant with the RF transmission. Loop size is dependent on the frequency of the mobile or cellular telephony transmission and the dielectric constant of the material in which the FPCB is embedded. Often multiple loops of varying sizes exist to resonate with the different bandwidths and frequencies of cellular telephony transmission. These loops couple inductively (i.e., passively) with the internal mobile telephony antenna.

Typically, the FPCB 1301 is located approximately 1 mm from the back surface of the tablet. This defines an antenna structure that is a combination of the internal mobile telephony antenna and the FPCB case-embedded antenna formed by the resonant loops and directors. This antenna structure has a much more directional radiation pattern than the internal mobile telephony antenna by itself (which has a substantially 360° radiation pattern). Because the antenna structure formed by the combination of the internal antenna and the case-embedded components has more radiative components located at the back of the device, the amount of radiation that was previously directed towards the user from the front of the device is substantially reduced.

Because only the shape of the radiation pattern (and not its overall power) has changed, however, the device still emits substantially the same TRP (e.g., within a tolerance of +/−2.5 dB) so that no loss in communication ability or quality occurs.

The FPCB may also contain directors 1302—copper strips that have lengths substantially equal to, for example, approximately ½ wavelength (or multiples thereof) of the RF waves emitted from the internal mobile telephony antenna. These directors 1302 provide a structure that spreads the coupled RF radiation from the internal mobile telephony antenna over a larger area or volume. The combination of resonant loops 1301 and directors 1302 provide a larger surface area or volume for cellular telephony emission, thereby reducing local intensity, while still substantially maintaining the TRP.

Note that the tablet external case is not intended to merely change the directionality of the antenna emissions, but to redistribute or spread the RF radiation over a larger area or volume through a combination of resonant conductive loops and director elements inductively coupled to the internal mobile telephony antenna of the tablet device. The effect of such radiation redistribution is that local radiation intensity is significantly reduced while still substantially maintaining the TRP.

FIG. 14 illustrates an exploded view of the external case components. The case 1201 is formed of an external shell 1401, a cover 1402 and an inside lining 1403. A FPCB 1303 fits into the shell 1401 and is covered by the lining 1403.

Note also that the resonant loops 1301 and elongated directors 1302 may be incorporated directly with the tablet device itself, either internally or externally, without the use of an external case in alternative embodiments.

Figure 15:
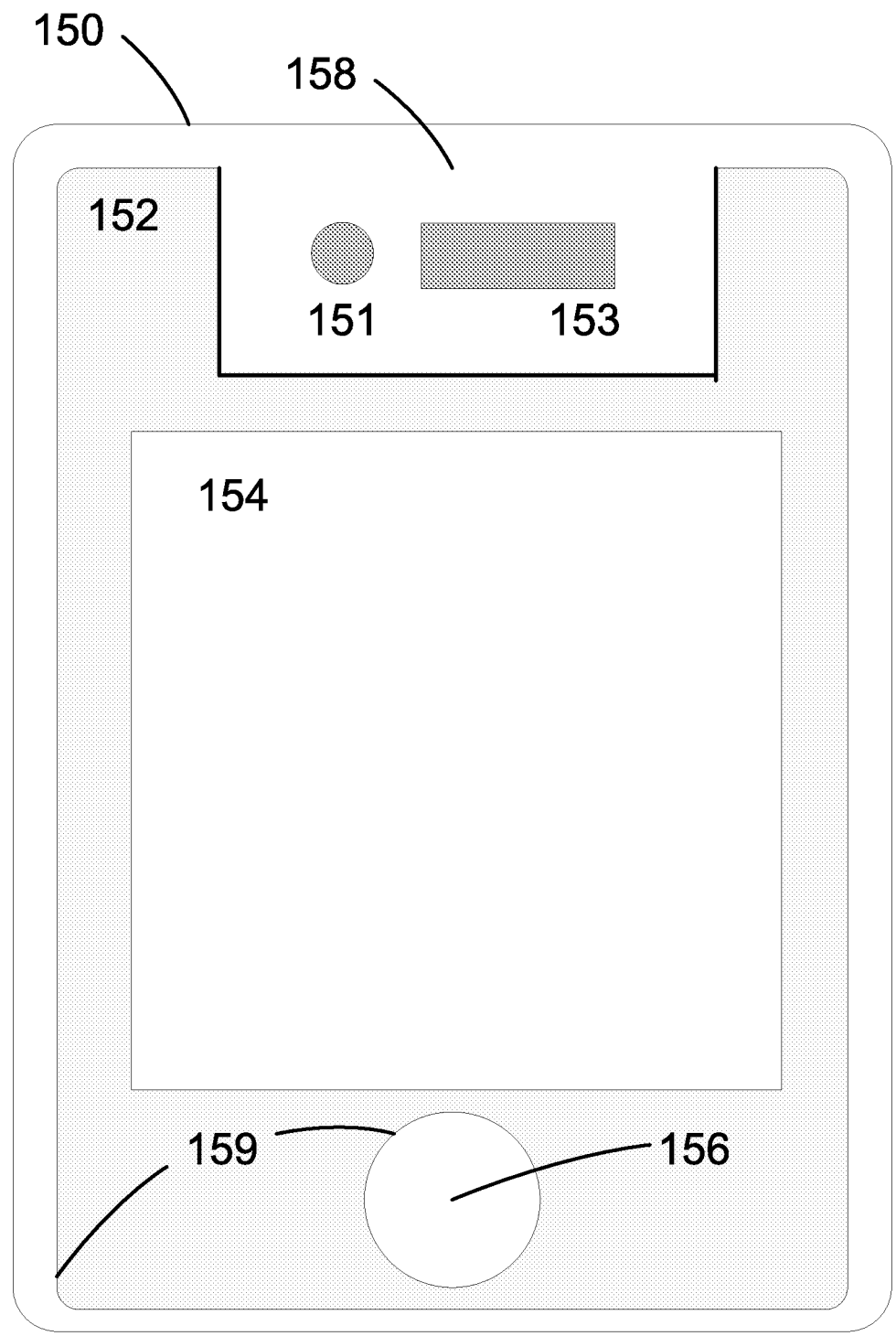
FIG. 15 is a schematic illustration of a protective cover for a wireless device, according to an embodiment.

FIG. 15 is a schematic illustration of a protective cover 152 for a wireless device, according to an embodiment. As described herein, such a wireless device can be a mobile communication device (e.g., a smart phone), a tablet computer device (e.g., an Apple iPad®), or any other type of portable device. Typically, the protective cover 152 is substantially planar. In other embodiments, the protective cover 152 can be in any non-planar form that is specifically adaptive to a surface (e.g., a non-planar surface) of the wireless device.

As shown in FIG. 15, the protective cover 152 can be attached to a surface 150 of the wireless device. The surface 150 can be an outer surface (e.g., a front surface) of the wireless device. In some embodiments, the protective cover 152 can be a planar sheet of material having a first surface (e.g., an outer surface) and a second surface (e.g., an inner surface). When the protective cover 152 is attached to the surface 150, the second surface of the planar sheet is disposed between the first surface of the planar sheet and the surface 150. That is, the second surface of the planar sheet is attached to the surface 150. Additionally, in some embodiments, the protective cover 152 is removably attached to the wireless device 150. That is, after being attached to the wireless device 150, the protective cover 152 can be detached from the wireless device 150.

The surface 150 includes a first portion that is covered by the protective cover 152 when the protective cover 152 is attached to the surface 150. Similarly stated, the protective cover 152 has a size and a shape that substantially correspond to a size and a shape of the first portion of the surface 150. In FIG. 15, that first portion is defined by the boundary 159. That is, the first portion includes the area inside the boundary 159, excluding the portion 156 and including the portion 154. When attached to the surface 150, the protective cover 152 is defined by a boundary that substantially corresponds to the boundary 159.

In some embodiments, the protective cover 152 is disposed between the first portion of the surface 150 and a user of the wireless device when the protective cover 152 is attached to the wireless device and when the wireless device is used by the user. For example, the surface 150 can be a front surface of a mobile telephone including an aperture associated with a speaker embedded within the wireless device, from which acoustic signals (e.g., voices, sounds) are sent out of the wireless device. The protective cover 152 is disposed between such a surface 150 and the body of a user (e.g., mouth, face, and ear) of the mobile telephone when the protective cover 152 is attached to the mobile telephone and when the user is using the mobile telephone for a phone call. For another example, the surface 150 can be a front surface of a tablet (e.g., iPad®) including a touchscreen of the tablet, through which a user of the tablet can view contents from the tablet and/or enter data into the tablet. The protective cover 152 is disposed between such a surface 150 and the body of the user (e.g., face, eyes) when the protective cover 152 is attached to the tablet and when the user is using the table (e.g., for reading an article, writing an email, etc.).

In some embodiments, the first portion of the surface 150 includes a screen 154, on which a user of the wireless device can view visual contents provided by the wireless device. Furthermore, in some embodiments, such a screen can be a touchscreen such that the user can enter information into the wireless device by touching the touchscreen. In both scenarios described above, the protective cover 152 is transparent such that the first portion including the screen and/or touchscreen is visible to the user when the protective cover 152 is attached to the wireless device. Additionally, when the protective cover 152 is attached to the surface 150 of the wireless device, the protective cover 152 covers the first portion (including the screen 154) such that the first portion of the surface 150 (including the screen 154) is protected by the protective cover 152 from, for example, scratching or other similar actions that can potentially damage the first portion of the surface 150.

The surface 150 also includes a second portion 158 that is not covered by the protective cover 152 when the protective cover 152 is attached to the first portion of the surface 150. The second portion 158 is mutually exclusive from the first portion of the surface 150. In some embodiments, the second portion 158 is associated with a proximity sensor of the wireless device. Such a proximity sensor can be any type of sensing device configured to detect an object (e.g., a body of a user) when that object is within a certain distance to the sensing device. In some embodiments, the proximity sensor can be, for example, a distance sensor, a light sensor, a temperature sensor, a combination of various sensors, and/or the like.

As shown in FIG. 15, the second portion 158 includes an aperture 153 associated with the proximity sensor that is embedded in the wireless device. Whenever an object (e.g., a hand or a body of a user) is within a certain distance (e.g., 10 mm) to the aperture 153 in a certain range of angles (e.g., in the direction perpendicular to the surface 150), the object can be detected by the proximity sensor and as a result, the proximity sensor is triggered. In some embodiments, as a result of the proximity sensor being triggered, operations of the wireless device can be affected. For example, transmission from the wireless device can be restrained such that a TRP of the wireless device is reduced. For another example, the wireless device can enter a sleep mode or a screen of the wireless device (e.g., the screen 154) can be dimmed. Furthermore, in some embodiments, the second portion 158 is also associated with other functions and/or components of the wireless device. For example, as shown in FIG. 15, the second portion 158 includes an aperture 151 associated with a camera that is embedded in the wireless device.

When the protective cover 152 is attached to the surface 150 of the wireless device and when the wireless device is operational, as a result of the protective cover 152 not covering the second portion 158, the apertures 151 and 153 are not covered by the protective cover 152. As a result, the proximity sensor is not triggered, and a direct access to the camera is not blocked. Thus, the camera and/or other functions and components of the wireless device can operate normally without any obstruction caused by the protective cover 152.

Additionally, in some embodiments, the surface 150 includes a third portion 156 that is mutually exclusive from the first portion and the second portion 158 of the surface 150. Such a third portion 156 can include element(s) of the surface 150 that is to be touched by a user of the wireless device when the user operates the wireless device. The protective cover 152 is configured not to cover the third portion 156 when the protective cover 152 is attached to the wireless device, such that the user can operate the wireless device by touching the third portion 156 when the protective cover is attached to the wireless device and when the wireless device is operational.

For example, as shown in FIG. 15, the third portion 156 includes a button that can be pressed to trigger an activation and/or action associated with the screen 154. For another example, the third portion 156 can include a keypad for the wireless device including buttons corresponding to digits 0-9, symbols "*" and "#", etc. Although not shown in FIG. 15, in other embodiments, the third portion 156 can include any other elements associated with the surface 150, and be in any shape specifically adapted for those element(s).

In some alternative embodiments, a protective cover made from two different materials can be configured to cover both the first portion and the second portion 158 of the surface 150 of the wireless device. When such a protective cover is attached to the surface 150, the first portion is covered by a first material such that the screen 154 and/or other elements in the first portion are visible to a user of the wireless device. The second portion 158 is covered by a second material different from the first material, such that the proximity sensor is not triggered and the camera can operate normally even though the apertures 151 and 153 are covered by the second material. In such embodiments, the second material can be any material that is, for example, transparent and/or thin enough to not trigger the proximity sensor and not block an access to the camera when the apertures 151 and 153 are covered by the second material.

In some other alternative embodiments, a protective cover made from the same material can have two or more than two portions with different thickness. When such a protective cover is attached to the surface 150 of the wireless device, the first portion of the surface 150 is covered by a first portion of the protective cover that is relatively thick, such that the screen 154 and/or other elements in the first portion of the surface 150 can be protected. The second portion 158 of the surface 150 is covered by a second portion of the protective cover that is relatively thin, such that the proximity sensor is not triggered and the camera can operate normally even though the apertures 151 and 153 are covered by the second portion of the protective cover. For example, the first portion of the protective cover can be, for example, 0.55 mm in thickness and the second portion of the protective cover can be, for example, 0.13 mm in thickness.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a protective cover configured to attach to a wireless device having a surface including a first portion and a second portion mutually exclusive from the first portion, the second portion of the surface being associated with a proximity sensor of the wireless device,
the protective cover configured to cover the first portion of the surface when the protective cover is attached to the wireless device,
the protective cover configured to not cover the second portion of the surface when the protective cover is attached to the wireless device such that the proximity sensor is not triggered by the protective cover when the protective cover is attached to the wireless device and when the wireless device is operational.

2. The apparatus of claim 1, wherein the protective cover is transparent such that the first portion of the surface is visible to a user of the wireless device when the protective cover is attached to the wireless device.

3. The apparatus of claim 1, wherein the first portion of the surface includes at least one of a screen of the wireless device or a touchscreen of the wireless device.

4. The apparatus of claim 1, wherein the protective cover is disposed between the first portion of the surface of the wireless device and a user of the wireless device when the protective cover is attached to the wireless device and when the wireless device is used by the user.

5. The apparatus of claim 1, wherein the protective cover is substantially planar, the wireless device is a tablet computer device.

6. The apparatus of claim 1, wherein:
the protective cover is configured to not cover a third portion of the surface when the protective cover is attached to the wireless device such that a user can operate the wireless device by touching the third portion of the surface when the protective cover is attached to the wireless device and when the wireless device is operational,
the third portion of the surface being mutually exclusive from the first portion and the second portion of the surface.

7. The apparatus of claim 1, wherein the protective cover is configured to be removably attached to the wireless device.

8. The apparatus of claim 1, wherein the protective cover is configured to attach to the wireless device such that a total radiated power (TRP) of the wireless device is not reduced when the proximity sensor is not triggered and the TRP of the wireless device is reduced when the proximity sensor is triggered.

9. The apparatus of claim 1, wherein:
the second portion of the surface is associated with a camera of the wireless device,
the protective cover configured to not cover the second portion of the surface when the protective cover is attached to the wireless device such that a direct access to the camera is not blocked by the protective cover when the protective cover is attached to the wireless device.

10. An apparatus, comprising:
a protective cover configured to be disposed with a wireless device having a proximity sensor such that the protective cover is disposed between the wireless device and a user of the wireless device during use without triggering the proximity sensor or reducing a total radiated power (TRP) of the wireless device during use,
the protective cover having a size and a shape that substantially correspond to a size and a shape of a portion of the wireless device that includes at least a screen of the wireless device.

11. The apparatus of claim 10, wherein:
the wireless device has an outer surface with a first portion and a second portion mutually exclusive from the first portion, the second portion of the outer surface of the wireless device including an aperture for the proximity sensor,
the protective cover has an outer boundary that substantially corresponds to an outer boundary of the first portion of the outer surface of the wireless device.

12. The apparatus of claim 10, wherein:
the wireless device has an outer surface with a first portion and a second portion mutually exclusive from the first portion, the second portion of the outer surface of the wireless device including an aperture for the proximity sensor, the protective cover configured to cover the first portion of the outer surface of the wireless device when the protective cover is disposed with the wireless device, the protective cover configured to not cover the second portion of the outer surface of the wireless device when the protective cover is disposed with the wireless device.

13. The apparatus of claim 10, wherein:

the wireless device has an outer surface that is substantially planar, the protective cover is substantially planar.

14. The apparatus of claim 10, wherein:

the wireless device has a camera, the protective cover is configured to be disposed with the wireless device without blocking a direct access to the camera.

15. The apparatus of claim 10, wherein the protective cover is configured to removably attach to the portion of the wireless device when the protective cover is disposed with the wireless device.

16. An apparatus, comprising:

a planar sheet of material having a first surface and a second surface, the planar sheet configured to be disposed with a wireless device having a screen and a proximity sensor such that the second surface of the planar sheet is disposed between the first surface of the planar sheet and the wireless device, the planar sheet of material defining an outer boundary that surrounds the screen of the wireless device and excludes the proximity sensor of the wireless device when the planar sheet is disposed with the wireless device.

17. The apparatus of 16, wherein the screen of the wireless device is a touchscreen.

18. The apparatus of 16, wherein the wireless device is a tablet computer device.

19. The apparatus of 16, wherein the planar sheet is configured to be disposed with the wireless device such that the planar sheet is disposed between the wireless device and a user of the wireless device during use.

20. The apparatus of 16, wherein the planar sheet is configured to be disposed with the wireless device such that the second surface of the planar sheet is removably attached to the screen of the wireless device when the planar sheet is disposed with the wireless device.

\* \* \* \* \*